United States Patent [19]
Hildebrandt et al.

[11] Patent Number: 4,774,514
[45] Date of Patent: Sep. 27, 1988

[54] METHOD AND APPARATUS FOR CARRYING OUT PASSENGER-RELATED AND FLIGHT ATTENDANT-RELATED FUNCTIONS IN AN AIRPLANE

[75] Inventors: Fred Hildebrandt, Buchholz; Joerg Reitmann, Harsefeld; Wilfried Sprenger, Issendorf; Bernd Roessner, Rosengarten, all of Fed. Rep. of Germany

[73] Assignee: Messerschmitt-Boelkow Blohm Gesellschaft mit beschraenkter Haftung, Munich, Fed. Rep. of Germany

[21] Appl. No.: 86,226

[22] Filed: Aug. 14, 1987

Related U.S. Application Data

[63] Continuation of Ser. No. 806,277, Dec. 6, 1985, abandoned, and a continuation-in-part of Ser. No. 757,274, Jul. 19, 1985, abandoned.

[30] Foreign Application Priority Data

Jul. 20, 1984 [DE] Fed. Rep. of Germany ....... 3426893
Dec. 8, 1984 [DE] Fed. Rep. of Germany ....... 3444802

[51] Int. Cl.$^4$ ............................................ G01C 21/00
[52] U.S. Cl. ................ 340/971; 340/825.06; 340/825.22; 379/49; 379/171; 381/57
[58] Field of Search ............ 340/971, 286 R, 286 M, 340/506, 525, 538, 825.06, 825.29, 825.05, 505, 825.22; 381/57; 379/37, 41, 49, 167, 170-173

[56] References Cited

U.S. PATENT DOCUMENTS

| | | | |
|---|---|---|---|
| 3,990,075 | 11/1976 | Schmitz et al. | 179/37 |
| 3,999,015 | 12/1976 | Snyder et al. | 179/37 |
| 4,173,754 | 11/1979 | Feiker | 340/538 |
| 4,342,023 | 7/1982 | Tsunoda et al. | 381/57 |
| 4,375,637 | 3/1983 | Desjardins | 340/825.06 |
| 4,392,125 | 7/1983 | Iwata | 340/505 |
| 4,574,305 | 3/1986 | Campbell et al. | 179/5 R |

OTHER PUBLICATIONS

"Interavia", vol. No.: 8, 1983; pp. 882 and 883, Multiplex Data Bases, How Standard Can They Be, by Pierre Condom.

Primary Examiner—Donnie L. Crosland
Attorney, Agent, or Firm—W. G. Fasse; D. H. Kane, Jr.

[57] ABSTRACT

On board functions are performed in an aircraft with the aid of a central control computer connected to a plurality of input and output devices including data terminals for passengers and flight attendants, through a data bus system and through decoder/encoder units linking the data terminals to the data bus system for providing an operation with digital signals. Thus, digital signals are transmitted back and forth between the central control computer and the data terminals in such a way that computations initiated on a data terminal are performed by the central control computer and so that the computation results and any other information are displayed on a display field forming part of the data terminals, one of which is provided at each passenger seat. Modified terminals are provided at various other locations within the aircraft cabin for use by a flight attendant.

12 Claims, 7 Drawing Sheets

METHOD AND APPARATUS FOR CARRYING OUT PASSENGER-RELATED AND FLIGHT ATTENDANT-RELATED FUNCTIONS IN AN AIRPLANE

CROSS-REFERENCE TO RELATED APPLICATION

This application is a continuation of application Ser. No. 806,277, filed Dec. 6, 1985, now abondoned, and a continuation-in-part application of U.S. Ser. No. 757,274, filed on July 19, 1985, now abandoned.

FIELD OF THE INVENTION

The present invention relates to a method and an apparatus for carrying out passenger-related and/or flight attendant-related functions in an airplane. Such functions include, for example, information, supply, monitoring, entertainment, intercommunication, management and service functions, among others.

DESCRIPTION OF THE PRIOR ART

In known arrangements of this type, the passenger-related and flight attendant-related functions are carried out by separate and independent units, each of which has its own cable system. The systems involved include loud-speaker systems, passenger call systems, indication signals, cabin lighting, passenger oxygen systems, etc.

In each of these systems, the pertaining cable systems or wiring, and components, are predominantly determined by the respective initial equipment of an aircraft. In other words, in order to save weight, only those wires are laid which belong to specific equipment.

The drawback of such prior art approach is seen in that for subsequent modifications, extensive rewiring and additional components are always necessary. Such rewiring becomes necessary, for example, when the seat spacing is changed, when a cabin class is enlarged or reduced, whereby the respective systems have to be adapted to the requirements of the moldification. The just mentioned modifications are referred to as aircraft cabin zoning and rezoning.

OBJECTS OF THE INVENTION

In view of the foregoing it is the aim of the invention to achieve the following objects singly or in combination:

to provide a method for performing functions in an airplane by flight attendants and by passengers, and an apparatus for carrying out this method, whereby the required wiring system, and the associated system components, can, after being installed in an airplane, be fundamentally used for all conceivable forms of the respective equipment without any need for late altering or rewiring the system;

to provide an apparatus for performing passenger and/or flight attendant functions in an airplane with the aid of digital data transmission and digital data processing;

to provide each passenger with a data terminal enabling a passenger to request, at his seat, certain information, to perform computer aided work, to use his seat terminal for entertainment, and to even use a telephone directly at his seat, and to have a display at his seat;

to provide for a more direct communication between any passenger and a flight attendant, and vice versa.

SUMMARY OF THE INVENTION

The foregoing objects have been achieved in accordance with the invention in that the signals required for the aforementioned functions are digitally prepared, and in that these signals are transmitted via a data bus system.

The arrangement of the present invention is characterized by a data bus system for transmitting digital signals pertaining to the aforementioned functions. This entire system includes at least one central control computer, and a plurality of locally distributed decoder/encoder units provided for passenger seats or groups of passenger seats, which respectively form an interface between terminals which are used to initiate an operation, and system units which carry out such operations in the form of the aforementioned passenger-related and flight attendant-related functions.

Pursuant to one advantageous aspect of the present invention, the function of the cabin loud-speaker system, for example, its volume, is controlled in such a way that the sound reproduction is automatically adjusted to the local acoustical conditions at a seat in the cabin, and to the particular cabin conditions, which depend upon the configuration of the airplane. One set of conditions is stored in a memory in digital form, another set of conditions may be provided by appropriate sensors in the aircraft.

The main advantages of the present invention are seen in that installation and rewiring operations are practially no longer required for any customer-specified nnstallation and subsequent conversion, so that the costs for zoning and rezoning the cabin are considerably reduced. Due to the simplicity of the programming used, there exists the possibility for the arrangement to be altered by the operator of the airplane himself in accordance with his own requirements.

According to the invention, passenger data terminals, located directly at the passenger seats, are connected to a central computer through a data bus system for exchanging digital signals in such a way that computer operations initiated at any of the passenger data terminals are performed by a central computer and the results are displayed at a display also provided for each passenger seat as part of a data terminal. The decoder/encoder units provided for each passenger are operatively connected through the data bus to the passenger data terminals provided at each passenger seat, and to the central control computer.

BRIEF DESCRIPTION OF THE DRAWINGS

In order that the invention may be clearly understood, it will now be described, by way of example, with reference to the accompanying, drawings, wherein.

DETAILED DESCRIPTION OF PREFERRED EXAMPLE EMBODIMENTS AND OF THE BEST MODE OF THE INVENTION

Figure 1:
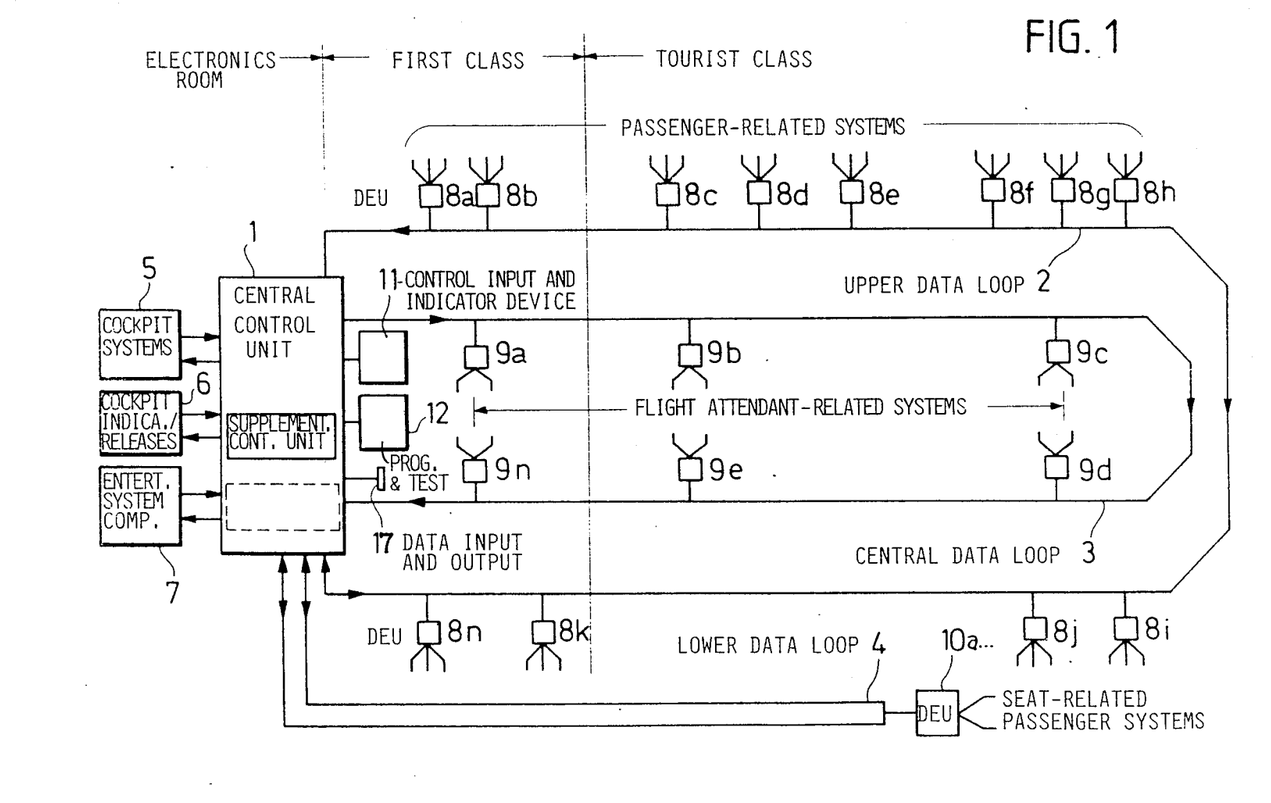
FIG. 1 is an overview of an operational diagram of an embodiment of an arrangement according to the invention.

FIG. 1 shows a central control computer 1 which is connected to bidirectional data loops 2, 3, and 4, and to freely addressable decoder/encoder units, referred to as D/E units or DEUs hereafter. Furthermore, the central control computer 1 is connected to cockpit systems 5, to cockpit indicators/cockpit initiated function inputs or so-called releases 6, and to entertainment-system components 7.

D/E units or DEUs 8a to 8n connect passenger-related system components through the data loop 2 to the central control computer 1. D/E units 9a to 9n connect flight attendant-related system components through data loop 3 to the central control computer 1. D/E units 10a to 10n connect seat-related passenger system components through the data loop 4 to the central control computer 1. A control input and indicator device 11 is also connected to the central control computer 1 along with a central programming and testing device 12 and data input and output system components 13.

Included in the passenger-related system components, which communicate through the D/E units 8a to 8n with the central control computer 1, are the following components:

(a) loud-speaker system components;
(b) passenger call system components;
(c) indicator signal components;
(d) cabin lighting components;
(e) passenger oxygen supply components;
(f) reading light system components.

The flight attendant-related systems, which are operatively connected through the D/E units 9a to 9n, to the central control computer 1 include the following components:

(g) flight attendant on-board communication system components;
(h) flight attendant call system components;
(i) evacuation signal providing components;
(j) cabin warning and indication system components;
(k) cabin management system components.

The passenger seat-related system components, which are controlled by the central control computer 1 through the D/E units 10a to 10n, include the following components:

(l) passenger entertainment system components;
(m) passenger terminal system components;
(o) passenger monitoring system components.

If, for example, a public address broadcast is to be made from the cockpit to all passengers, such address can be made through the cockpit inputs 6 to the control computer 1, which appropriately converts the signal and feeds it in digital form to the data loop 2, so that the loudspeakers 25 receive their low-frequency signal after it has been decoded, adapted in accordance with the individual installation location, and amplified in the D/E units 8a to 8n. If only a specific group of passengers is to be addressed, for example those in first class, only the relevant DEUs are activated by a free addressing operation.

An important advantage of the present system is seen in that a change, for example changing a cabin with a single class seating arrangement into a two class seating arrangement, can be easily made without the above mentioned rewiring necessary in the prior art. The required changed system functions can be adapted to the new conditions by programming without the requirement for any type of change in the wiring nor by supplementing of components, for example, amplifiers, which would be the case in the prior art if the mentioned change into two classes needs to be made. The same changes can also be made by more programming changes in the other mentioned system components, i.e., the passenger-related system components, flight attendant-related system components, and seat-related system components. The operation is functionally similar, and the same advantages exist with regard to the programmable system changes. These changes can be effected by the manufacturer of the aircraft, or by the user.

Instead of using but one central control computer, more than one such central control units can be provided. Similarly, in place of the three bidirectional data loops, other alternative arrangements are also possible, combined with bidirectional and/or unidirectional data transmitting conductors, the assembly and sequence of which satisfy the transmission requirements of all the interlinked system components. Not only electrical conductors, balanced or unbalanced, but also light conductors can be used as signal transmission means.

Figure 2:
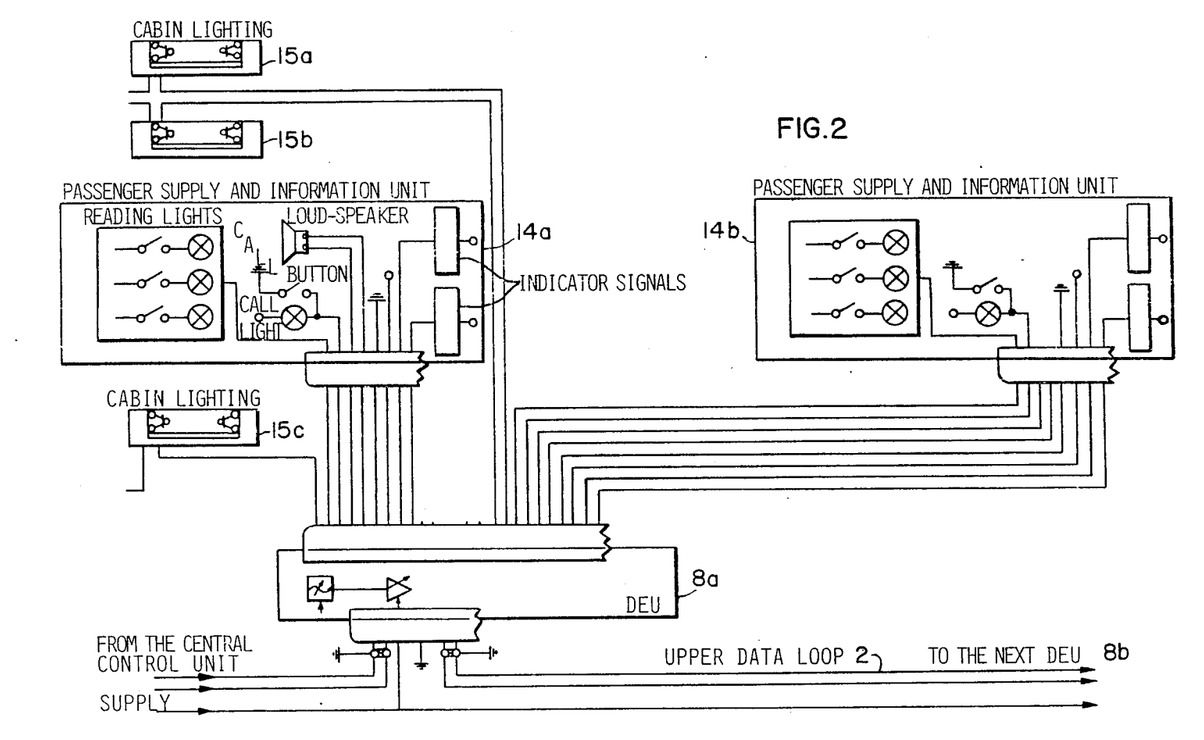
FIG. 2 shows a decoder/encoder unit as an interface between a data bus to a central computer and passenger-related system components.

FIG. 2 shows a D/E unit 8a, . . . for the passenger-related systems including interfaces for connection to other components. Each D/E unit cooperates with two passenger supply and information units 14a and 14b including their signal emitters and receivers. In addition, each D/E unit controls three fluorescent strip lamps 15a to 15c, which are located in the passenger-related zone.

Figure 3:
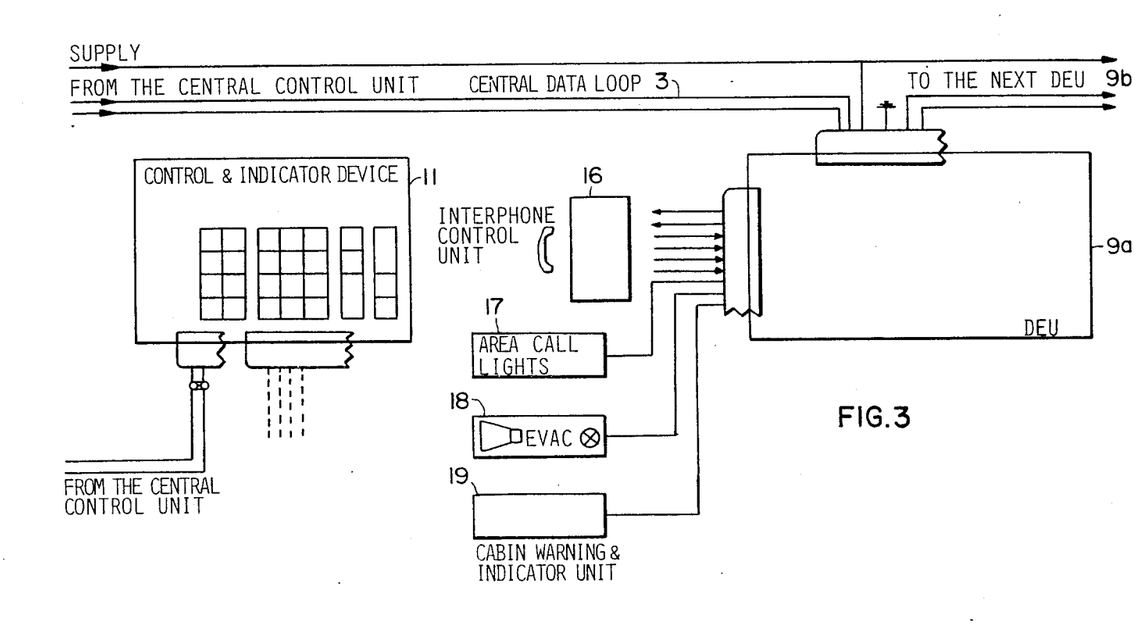
FIG. 3 shows a decoder/encoder unit as an interface to flight attendant-related system components.

FIG. 3 shows a D/E unit 9a, . . . for the flight attendent-related systems including interfaces for connection to other components including an interphone control unit 16, area call lights 17, evacuation indicator 18, and a cabin warning and indicator unit 19.

A general error indication appears on the control and indicator device 11, which is connected directly to the central control computer 1. The exact address-related error indication takes place in any given instance on the programming and test control unit 12 shown in FIG. 1.

Figure 4:
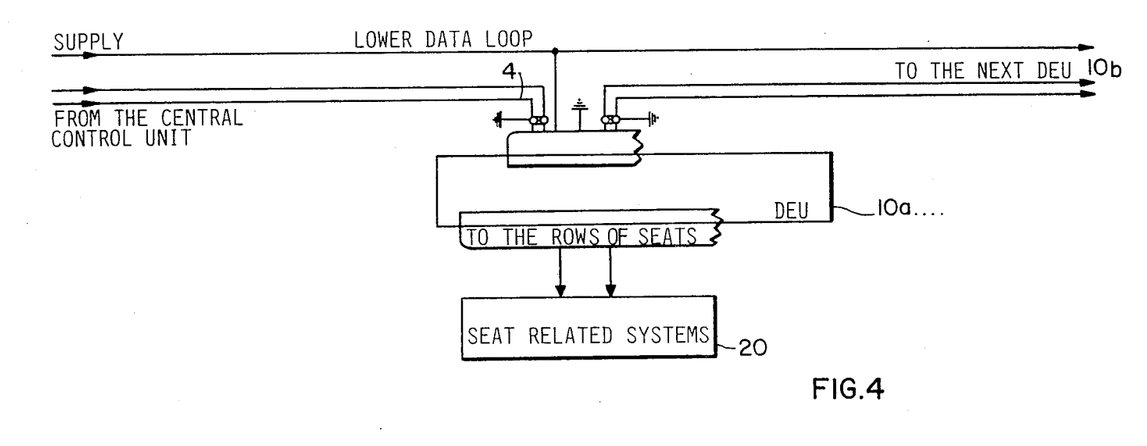
FIG. 4 shows a decoder/encoder unit as an interface to passenger seat-related system components.

FIG. 4 shows a seat-related D/E unit 10a, . . . for connection to seat-related system components 20 including components for entertainment, for the selection of music or talk programs, for connecting a terminal for personal use for the input, output, and information indication at the request of the user, from the central control computer 1 or from existing systems. The D/E units 10a, . . . also provide communication paths for passenger monitoring units, such as seat-occupancy indicators, and for checking the condition of the seat equipment.

Figure 5:
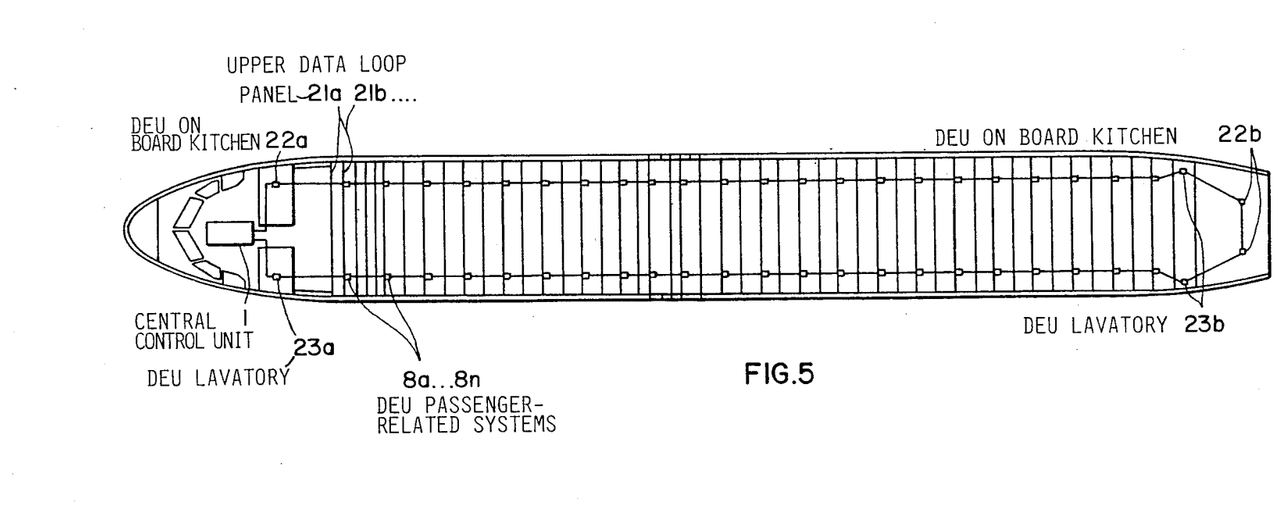
FIG. 5 shows an embodiment of a data bus installation inside of an aircraft body.

FIG. 5 shows one embodiment of a data bus installation for the connection of the passenger-related D/E units 8a to 8n, installed on the panels or frame members 21a to 21n in conformity to the number required, in this case on each second panel. Additional D/E units are provided in the vicinity of the on-board kitchens 22a, 22b, and in the vicinity of the lavatories 23a and 23b.

This arrangement assures that the passenger-related system components need to be connected to the respective DEUs via only short prefabricated lines.

A respective data loop is connected to the central control computer 1, which is located in the electronics room. In general, the D/E units are connected to the data loops in such a way, that damage is prevented even if an error is made in a D/E unit or on their analog side. Similarly, a failure or breakdown is limited to those systems or system components which are directly connected to the respective defective or removed D/E unit. The only result is, that these components are no longer supplied with data.

Figure 6:
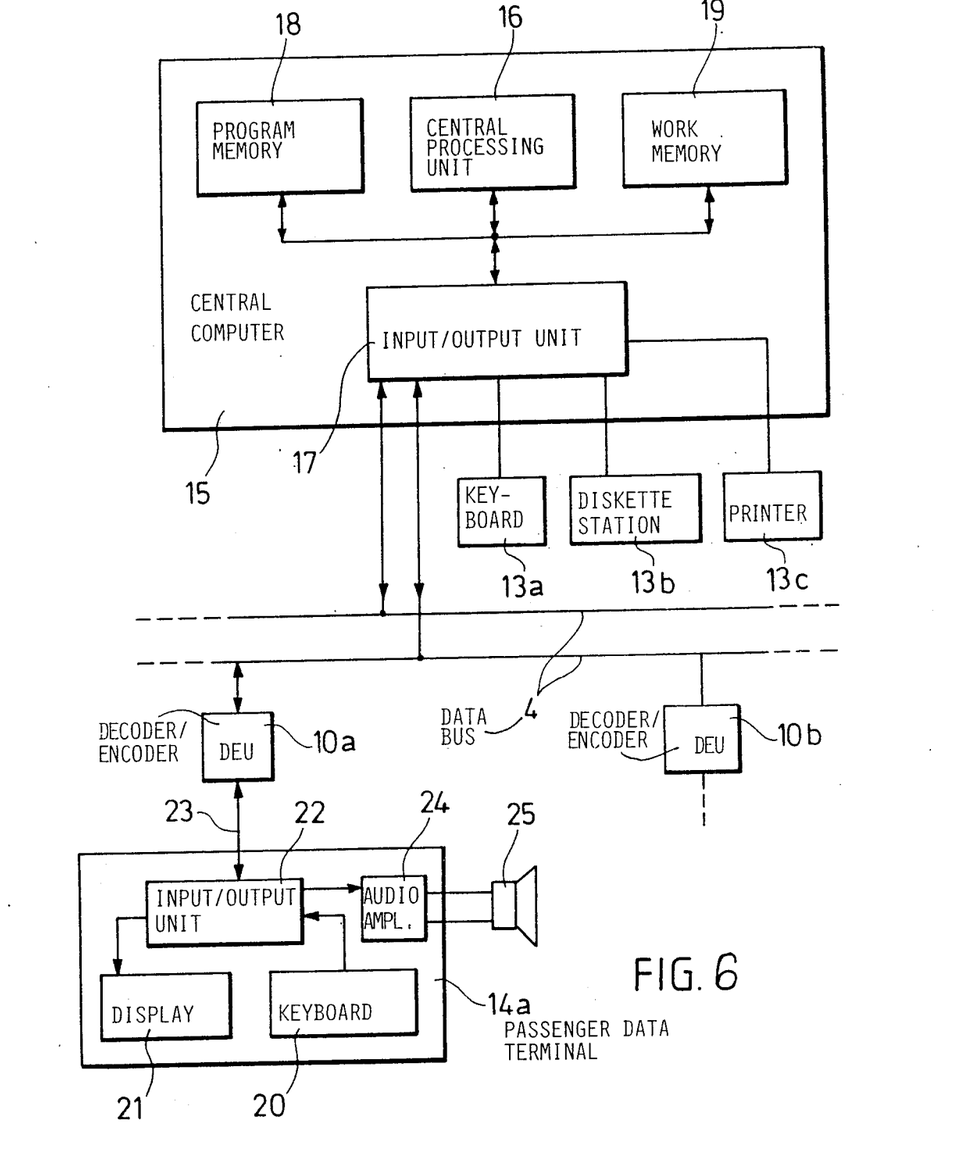
FIG. 6 is a block diagram of a central computer system and one passenger system interconnected by a common data bus.
Figure 7:
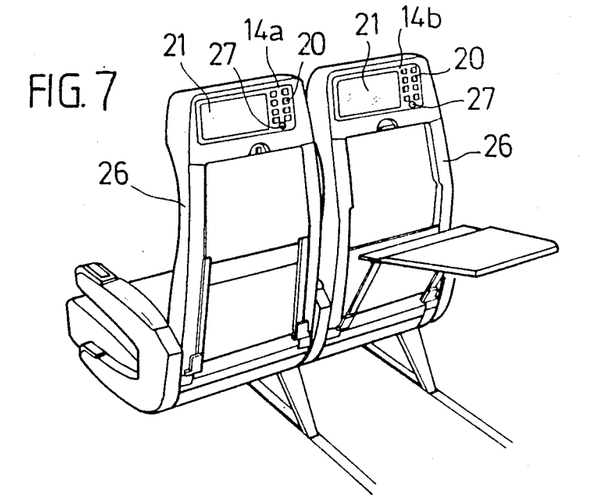
FIG. 7 is a perspective view against the back of passenger seats equipped with a passenger data terminal.
Figure 8:
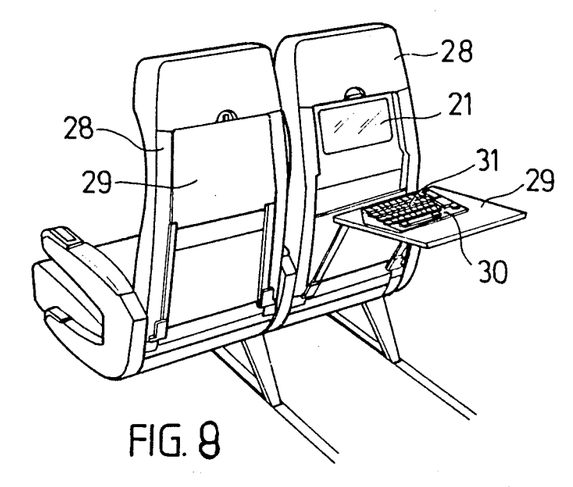
FIG. 8. is a view similar to FIG. 7 showing a passenger data terminal with a typewriter keyboard.

FIG. 6 shows an individual passenger data terminal 14a. A plurality of such passenger data terminals 14a to 14n are mounted in locations for convenient access by the respective passenger, for example, to the back of a seat just ahead of the passenger as shown in FIGS. 7 and 8. A decoder/encoder unit 10a connects the terminal 14a through the data loop 4 which in turn is connected to the central control computer 15. The control computer 15 comprises a central processing unit 16, an input/output unit 17, a program memory 18, and a work or processing memory 19.

The passenger terminal 14a comprises substantially an input keyboard 20, a display or indicator field 21, and an input/output unit 22 connected through an individual wiring 23 with the above mentioned decoder/encoder unit 10a. Each passenger data terminal has its own decoder/encoder unit as shown in FIG. 1. The input/output unit 22 is connected with an output to an audio stage 24 including an amplifier connected to earphones or a loud-speaker 25.

The central control computer 15, or rather its input/output unit 17 shown in FIGS. 1 and 6, is connected directly with the central control computer 15. The input part may comprise a keyboard 13a and the output part may comprise a diskette station 13b and/or a printer 13c. The diskette station 13b may also be used for the output of data. Each terminal 14a to 14n is so connected to the seat of a passenger or rather the seat just ahead of the particular passenger, that the latter can easily operate his terminal. The data exchange takes place through the data bus or loop 4 forming part of the above mentioned data bus system. Thus, the invention employs a type of computer system primarily comprising a central control computer 1, 15 and several input/output terminals connected to the central control computer 15. It is possible to construct such a system by using conventional components and standardized operational devices having known circuitry, whereby the assembly of the entire apparatus would take into account the requirements needed for performing the functions as disclosed herein. The central control computer should be capable to perform the following functions: calculate computational problems supplied by the passenger through his data terminal, display foreign words and their equivalents on the passenger's display. In other words, provide a dictionary for improving communication for a passenger who speaks one language and a stewardess who does not speak the passenger's language, and to facilitate the understanding of foreign language literature that a passenger might be reading during the flight. The central control computer should also be able to provide information relating to the respective flight, such as the flight number, the distance travelled between starting and landing and any intermediate points, as well as the instantaneous flight altitude.

The central control computer should also provide in its memory oral announcements or commentaries regarding items that may be worth seeing during the flight. Further data that may be of interest to a passenger should also be made readily available to his display unit 21 in response to a request made on his keyboard 21, for example, with regard to the starting airport, the destination, the distance, the flight duration, the remaining flight distance, the remaining flight duration, and similar information such as the weather at the point of destination. The central control computer should also provide programs for playing games, such as video games, checkers, chess, or the like. The central control computer should further provide several music programs from which the passenger can make his selection in different music channels for different music categories selectable on his keyboard with a rendition through an earphone set. The central computer should further provide information, retrievable also by the passenger's keyboard, with regard to the entire flight schedule of the particular carrier, including connecting flights, information regarding local transportation at the point of destination, current news items, stock exchange listings, selected BTX functions, and entertainment available at the point of destination, religious services, information regarding exhibitions and fairs, as well as information regarding car rental companies. Any passenger should be able to play a game, e.g., a video game, with any other passenger. If the aircraft is equipped with an on board to ground telephone system, the passenger data terminal 14a... would be so equipped that the passenger can make a request for a long distance connection directly from his seat with the aid of his keyboard, whereupon the passenger will receive a respective signal when the connection has been completed. The respective conversation may then be made in a separate telephone booth.

The data necessary for the above mentioned purposes and provided for display in response to a request made by a passenger, are placed on board prior to the beginning of a flight by providing a respective number of diskettes. The music programs and newsworthy items may be stored in compact cassettes. With regard to a music entertainment program, a list may be provided to the passenger on the basis of which he can make his selection with the aid of his keyboard. For this purpose cassette players are used capable of playing a plurality of cassettes, whereby the respective magnetic tapes carry, in addition to the recorded music tracks, for example, a digital address track. With the aid of the disclosed digital signals it is possible to check and find the starting points of the respective music title with the aid of a rapid run.

Due to providing an interface or decoder/encoder unit 10a... to 10n, each seat already has its own address so that it is not necessary to provide features which would prevent the unauthorized entry of another passenger into the program selected by one passenger. Due to the inherent address of each seat, it is further made sure that any program or item requested by the passenger of that seat is also supplied to the respective passenger and not to somebody else. Thus, it is prevented that a passenger can call up the memory content resulting from a use of the central control computer by another passenger. Further, the memory contents are automatically erased at the end of each flight. Therefore, it is not possible that the respective information can be called up by another passenger who happens to sit in the same seat in which a previous passenger has been sitting on a previous flight.

It is suitable that the computer capacity made available through the passenger data terminals 14a to 14n corresponds approximately to the capacity of a personal computer, whereby the respective results could be provided by the data output 13 in the form of a printout or in the form of a diskette having the information written thereon. It is possible to use diskettes having dimensions and formats corresponding to those of the mostly used standard types. Preferably, the central control computer 15 would form part of the system located in the electronics room.

FIG. 7 shows perspectively two passenger seats with the passenger data terminals 14a, 14b secured to the back rest 26 of the seats. The keyboard 20 and the display 21 is illustrated. It is conceivable that even individual movies could be shown on the display screens 21.

The display screen 21 can have any suitable known form or type as are commonly used in display devices, whereby however, the flat display types are of practical interest, such as the liquid crystal, light emitting diodes, or gas discharge image screens.

FIG. 8 shows a view similar to that of FIG. 7 with a modified arrangement of the passenger data terminal. In FIG. 8 the display screen 21 is located in the back rest 28 in such a position that it is covered by the table top 29 as shown in the left-hand part of FIG. 8. When the table top 29 is folded down into an operational position as shown in the right-hand part of FIG. 8, the display screen 21 becomes visible and a data input unit 30 having a typewriter type of keyboard 31 may be placed on the table top 29, whereupon a plug-in connection is established. The plug-in connection is not shown. When not in use, the input unit 30 would be stored, for example, in a compartment below the table top 29 in the back rest 28. With the aid of the keyboard 31, alpha numeric computer inputs may be made.

The advantages of the invention are seen in that the individual passenger can now request specific informations of interest to him without disturbing other passengers. The passenger can perform computer work, or he can select his entertainment from a wide range of possibilities, including video games and the like. Thus, the passenger may obtain information specifically related to his travel or he may use his time effectively for work related to his profession, he may entertain himself in accordance with his tastes.

Although the invention has been described with reference to specific example embodiments, it will be appreciated, that it is intended to cover all modifications and equivalents within the scope of the appended claims.

What we claim is:

1. A zoning and rezoning system for changing any portion of an aircraft cabin from one class zone to another class zone, comprising central control computer computer means for controlling a zoning and rezoning operation in said aircraft, said central computer means including first control input means (11, 12) for entering control programs and instructions into said central computer means, first means for performing passenger-related functions, second means for performing flight attendant-related functions, third means for performing passenger seat-related functions, second control input means for at least certain of said first, second and third means for controlling the function thereof, data bus means including a plurality of data transmitting signal conductor loops permanently installed in said aircraft cabin for electrically connecting said first means, said second means, and said third means to said central computer means, individual decoder/encoder units connecting said first, second, and third means through said permanently installed signal conductor loops of said data bus means in parallel to said central computer means for transmitting signals in digital form from said first, second, and third means to said central computer means and vice versa, said permanently installed signal conductor loops of said data bus means also electrically connecting said second control input means to said first, second, and third means, said first control input means comprising keyboard means for entering aircraft cabin class dependent conditions into said control programs for allocating through said keyboard means selected signal conductors of said permanently installed signal conductor loops in a prtion of said aircraft cabin to a desired cabin class zone substantially without physically changing said permanently installed, signal conductor loops.

2. The system of claim 1, wherein said first means for performing passenger-related functions comprise loudspeaker system components for providing sound to be heard by passengers, passenger call system components for enabling a passenger to initiate a communication, indicator system components for indicating information to a passenger, cabin lighting components for lighting said cabin, passenger oxygen supply components for providing oxygen to passengers in an emergency, and reading light system components for supplying light individually to a passaenger seat, wherein said second means for performing flight attendant-related functions comprise flight attendant on-board communication system components for enabling a flight attendant to initiate a communication, evacuation signal providing components for use by a flight attendant to cause an evacuation of the aircraft cabin, cabin warning and indication system components for providing information to the crew, and cabin management system components for performing cabin services, wherein said third means for performing passenger seat-related functions comprise passenger entertainment components for providing entertainment to passengers, passager terminal components for enabling a passenger to use the system, passenger telephone components for providing telephone communication to and from a passenger, and passenger monitoring components for enabling an attendant to monitor a passenger, and wherein all of said components are each individually linked through said decoder/encoder units to said data bus means which connect all said components in parallel to said central computer means.

3. The system of claim 2, wherein said first control input means comprises flight attendant operated keyboard means (11) for entry of flight attendant generated signals into said system, and wherein said second input means comprise passenger operated keyboard means (31) for entry of passenger generated signals into said system.

4. The system of claim 1, wherein said permanently installed signal conductor loops of said data bus means comprise a first signal conductor loop (2) for connecting said first means to said central computer means, a second signal conductor loop (3) for connecting said second means to said central computer means, and a third signal conductor loop (4) for connecting said third means to said central computer means.

5. The system of claim 2, wherein said central control computer means comprise memory means for storing first acoustical conditions of said aircraft cabin in digital cabin in digital form, means for sensing instantaneous aircraft cabin configuration dependent second acoustical conditions, and means for controlling the volume and frequency response characteristic of said loudspeaker system components in response to said first and second conditions.

6. The system of claim 1, wherein said first control input means comprise a central programming and test control device (12) for the input and retrieving of information relating to an aircraft cabin layout including a seat arrangement in said aircraft cabin, whereby a programming and testing operation may be performed in accordance with said information, said device furtehr including means for the recognition of errors and malfunctions.

7. The system of claim 3, wherein said passenger operated keyboard means are part of said passenger terminal components, said passenger terminal being connected through said decoder/encoder units and said data bus means to said central control computer means for exchanging digital signals between said central control computer means and said passenger terminal components and vice versa, whereby a passenger has access to said central control computer means for retrieving information, said passenger terminal components comprising display means for displaying retrieved information individually for each passagenger.

8. The system of claim 1, wherein said third means comprise passenger data terminals including a display field in each passenger data terminal located at each passenger seat, said decoder/encoder units connecting said passenger data terminals to said central control computer through said data bus means for data transmission in digital form back and forth between said passenger data terminals and said central control computer.

9. The system of claim 8, wherein said passenger data terminals are arranged at or nn backsides of back rests of passenger seats for acess by a passenger seated in the next seat.

10. The system of claim 1, wherein said second control input means comprise at least one flight attendant operated keyboard for said central control computer means, and at least one data output device for said central control computer for providing a data output for a flight attendant.

11. The system of claim 10, wherein said data output device comprises a diskette station for a data printout.

12. The system of claim 10, wherein said data output device comprises a printer for printing out data received from said central control computer means.

* * * * *

UNITED STATES PATENT AND TRADEMARK OFFICE
CERTIFICATE OF CORRECTION

PATENT NO. : 4,774,514

DATED : September 27, 1988

INVENTOR(S) : Fred Hildebrandt et al.

It is certified that error appears in the above-identified patent and that said Letters Patent is hereby corrected as shown below:

Claim 1, line 4, delete "computer";

Claim 1, line 32, replace "prtion" by --portion--;

Claim 2, line 23, replace "passager" by --passenger--;

Claim 3, line 2, replace "comprises" by --comprise--;

Claim 5, line 4, delete "cabin in digital--;

Claim 6, line 7, replace "furtehr" by --further--;

Claim 7, line 3, replace "passenger terminal" by --passenger terminal components--;

Claim 9, line 2, replace "nn" by --on--;

Claim 9, line 3, replace "acess" by --access--.

Signed and Sealed this

Seventh Day of February, 1989

*Attest:*

DONALD J. QUIGG

*Attesting Officer*     *Commissioner of Patents and Trademarks*